United States Patent [19]

Berni

[11] Patent Number: 4,477,887

[45] Date of Patent: Oct. 16, 1984

[54] LOW NOISE MOUNTING FOR ACCELEROMETER USED IN MARINE CABLE

[75] Inventor: Albert J. Berni, Houston, Tex.

[73] Assignee: Shell Oil Company, Houston, Tex.

[21] Appl. No.: 300,430

[22] Filed: Sep. 8, 1981

[51] Int. Cl.³ .............................................. G01V 1/38
[52] U.S. Cl. .................................... 367/20; 181/110; 181/112; 181/154
[58] Field of Search ................................ 367/15–24, 367/177, 166, 171, 154; 181/110, 112; 73/516

[56] References Cited

U.S. PATENT DOCUMENTS

| | | | |
|---|---|---|---|
| 3,054,085 | 9/1962 | Alexander | 367/177 |
| 3,299,397 | 1/1967 | Pavey, Jr. et al. | 367/24 |
| 4,078,223 | 3/1978 | Strange | 181/112 |
| 4,134,097 | 1/1979 | Cowles | 367/15 |
| 4,210,897 | 7/1980 | Hutchins | 181/110 |
| 4,296,481 | 10/1981 | Weiss | 367/20 |
| 4,317,185 | 2/1982 | Thigpen et al. | 367/130 |

Primary Examiner—Nelson Moskowitz
Assistant Examiner—K. R. Kaiser

[57] ABSTRACT

A marine seismic streamer cable having both pressure responsive and acceleration responsive transducers disposed therein. The accelerometer responds to acceleration along one axis regardless of its orientation about the other axis. The accelerometer is mounted in the streamer cable and responds to accelerations produced by a seismic source but is insulated from the noise and motion produced as the streamer cable is towed through the water.

11 Claims, 6 Drawing Figures

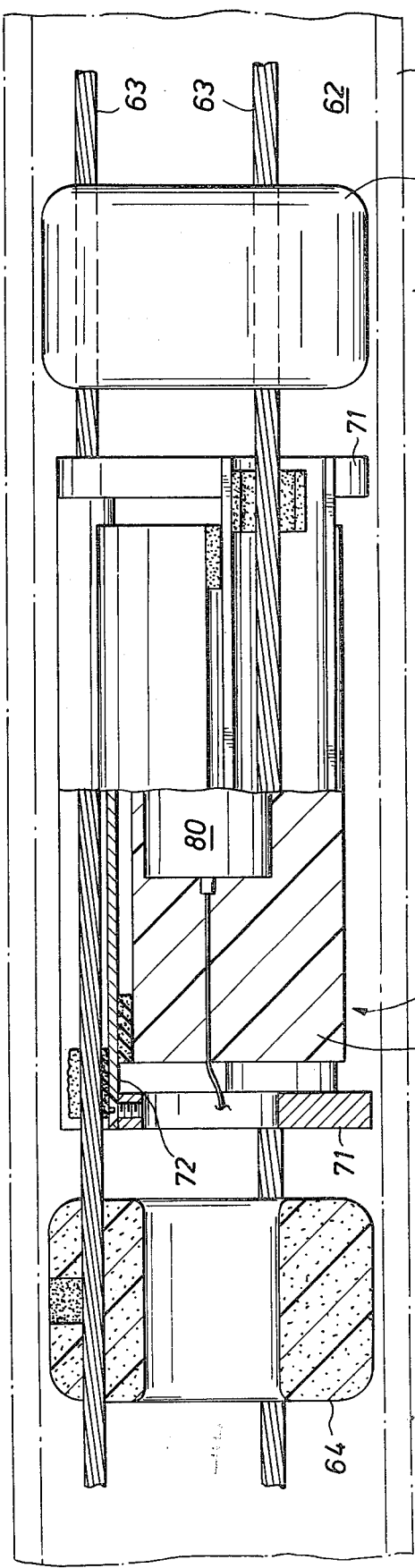
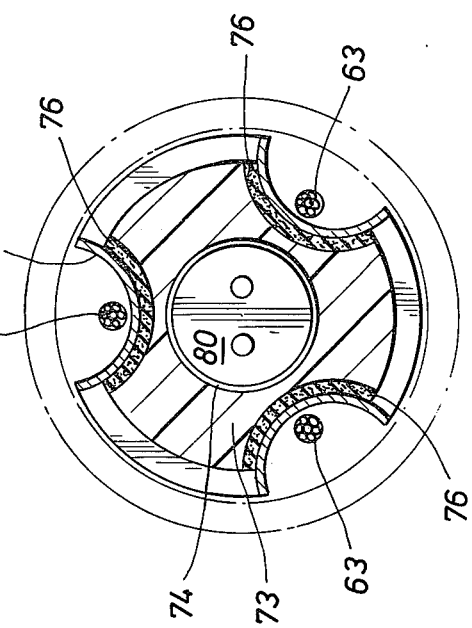
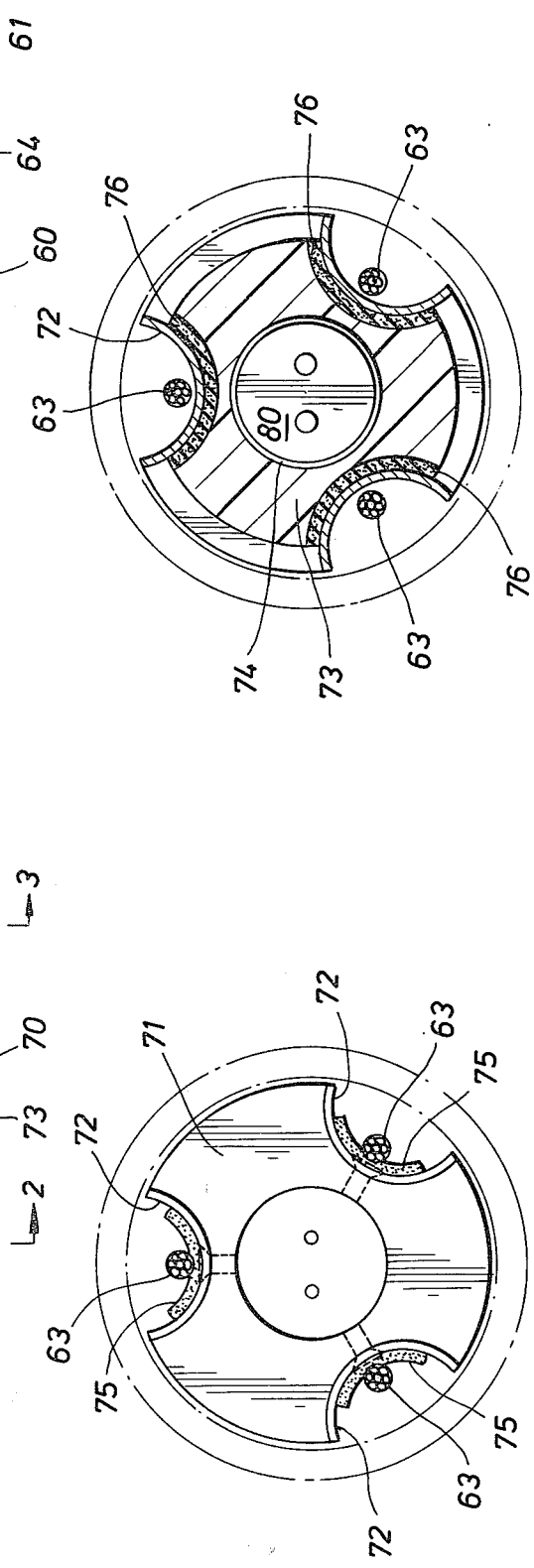

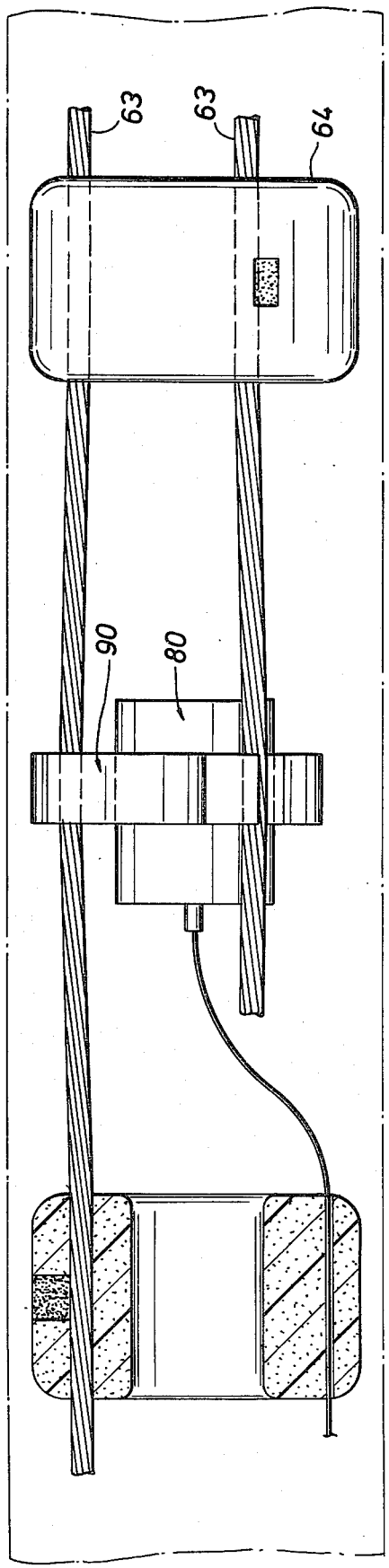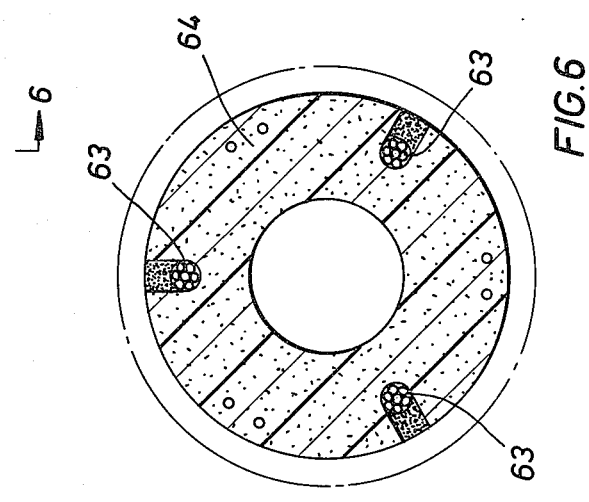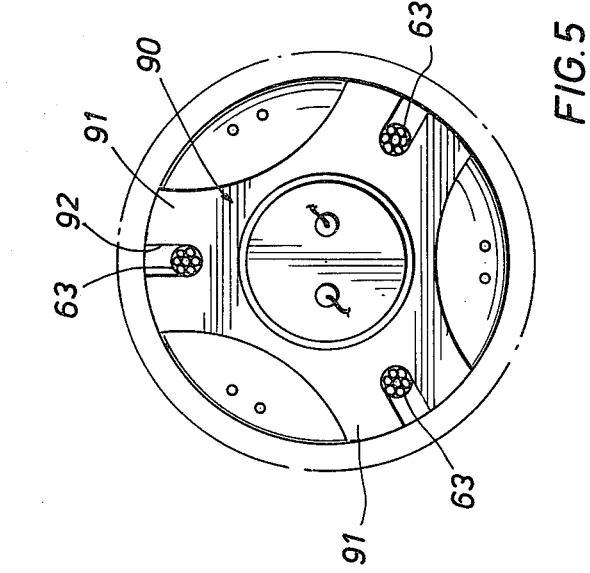

LOW NOISE MOUNTING FOR ACCELEROMETER USED IN MARINE CABLE

RELATED APPLICATION

This application is related to application Ser. No. 210,483 filed Nov. 26, 1980, by A. J. Berni and entitled "Vertical Component Accelerometer," now U.S. Pat. No. 4,345,473.

BACKGROUND OF THE INVENTION

It is conventional in offshore seismic operations to tow a long marine streamer cable behind an exploration vessel at a controlled depth. The streamer cable contains hydrophones that detect pressure variations produced by reflected seismic waves. The reflected seismic waves are the result of a seismic wave travelling through the earth and being reflected back to the surface. The seismic waves, of course, are produced by a seismic source, such as an air gun. The signal produced by the streamer cable will have several frequencies of reduced amplitude as a result of the surface reflected wave or ghost.

The ghosts are produced by upgoing reflected wavefront striking a horizontal boundary, i.e., the ocean surface and being reflected back to the hydrophone located below the surface. As the wavefront strikes the boundary, its phase or polarity will be reversed because of the negative reflection coefficient of the air/water interface. Thus, if the distance between the hydrophone and the surface and back to the hydrophone is equal to one wave length of a particular frequency, or a multiple therof, the amplitude of that frequency and its multiples will be reduced.

It has been appreciated as described in U.S. Pat. No. 3,290,645 that the frequencies cancelled by the above phenomena could be replaced by the use of geophones to record these frequencies. Geophones respond to the particle velocity of wave motion rather than the pressure. The wave of particle velocity will have a positive reflection coefficient at the air/water interface. Thus, if the distance between geophone and surface and back to the geophone is equal to one wave length of a particular frequency, or a multiple thereof, the amplitude of the frequency and its multiples will be increased. Thus, the geophone signal will replace the frequencies that are removed in the hydrophone signals. Accelerometers could be used instead of geophones for this purpose. The accelerometer signal could be integrated electronically, or numerically in a computer after recording, to produce an estimate of the velocity signal. U.S. Pat. No. 3,281,768 describes the use of accelerometers and hydrophones in a marine streamer cable. The patent also describes integrating the accelerometer signal and combining it with the pressure signal produced by the hydrophone. Theoretically, this would solve the problem of missing frequencies but in practice the noise introduced by the slip rings shown in the patent is amplified by integration. The resulting signal-to-noise ratio makes it difficult if not impossible to combine the two signals. While it has been appreciated that geophones could be used to replace these missing frequencies, it is difficult to obtain a geophone or an accelerometer which will operate in a marine seismic environment. Geophones and accelerometers require that their axes be very carefully aligned in certain directions in order to obtain proper response. It can be readily appreciated that it is difficult to maintain the proper alignment of the axes in a marine streamer towed behind a vessel because the cable undergoes continuous and random rotation around its longitudinal axis. In addition, the accelerometers may be sensitive to pressure and thus respond to the pressure produced by the reflected seismic waves. The response to the pressure variations results in noise that tends to mask or cancel the true accelerometer signal.

BRIEF DESCRIPTION OF THE INVENTION

The present invention solves the above problems by utilizing an accelerometer manufactured by Litton Resources Systems of 3930 Westholme Drive, Houston, Tex., in combination with a mounting which decouples the accelerometer from the marine cable structure. The accelerometer supplied by Litton Resources is cylindrical in shape and responds to the vertical component of acceleration independent of the device orientation. The accelerometer also responds to pressure waves in addition to accelerations. The present invention utilizes the accelerometer in a special mount which effectively decouples the accelerometer from noise vibrations propagating along the cable. In addition, the mounting effectively blocks the pressure variations from the accelerometer thus eliminating this spurious response. Thus, the accelerometer responds only to vertical accelerations produced by seismic waves which pass the marine streamer cable. The principal means of decoupling is the use of foam pads between the accelerometer and the other internal cable parts and to further decouple the accelerometer from the cable structure, the density of the mounting and the accelerometer are made substantially equal to the density of the fluid filling the marine streamer cable. This ensures that the mount will tend to float within the marine cable and not compress, and therefore make ineffective, the foam decoupling pads.

Two types of mounts are provided by the present invention with both mounts being disposed within the tension members of the marine cable. One mount utilizes a filled plastic foam for supporting the accelerometer. The foam may be filled with micro-size glass spheres to accurately control the density of the combination mount and accelerometer so that it matches the filling fluid. The mounting for the accelerometer is disposed within a cage which is positioned inside the three stress members of the cable. In order to isolate the accelerometer mount from movement of the stress members, suitable low density resilient foam is positioned between the plastic foam-filled accelerometer mount and the cage mount. If desired, further isolation in the form of low density resilient foam may be provided between the cage mount and the stress members.

The alternate accelerometer mount comprises a mounting which is positioned directly within the three stress members. Again, suitable low density resilient foam is used to isolate the mounting from movement of the stress members. Potting the accelerometer in a rigid plastic or metal case is again used to lessen the spurious sensitivity to pressure.

BRIEF DESCRIPTION OF THE DRAWINGS

The present invention will be more easily understood from the following detailed description when taken in conjunction with the attached drawings in which:

FIG. 1 is an elevation view, partially in section, of one mounting means of the present invention.

FIG. 2 is a vertical section along line 2—2 of FIG. 1.
FIG. 3 is a vertical section along line 3—3 of FIG. 1.
FIG. 4 shows an elevation view of the second embodiment of the invention.
FIG. 5 is a vertical section along line 5—5 of FIG. 4.
FIG. 6 is a vertical section along line 6—6 of FIG. 4.

DESCRIPTION OF PREFERRED EMBODIMENTS

Referring now to FIGS. 1, 2 and 3, there is shown a means for mounting the accelerometer described above in a marine seismic streamer cable. In particular, the cable 60 comprises an outer flexible tubular member 61 whose interior 62 is filled with a fluid, preferably a hydrocarbon such as mineral spirits or kerosene to provide buoyancy for the cable. Normal practice is to design the density and volume of the liquid filling so that the cable including all components has a slight positive buoyancy. The cable is provided with three stress members 63, which extend along the complete length of the cable and are held in an equilateral position by means of molded spacers 64. As shown, the spacers 64 are cylindrical and provided with openings through which the stress members 63 may be passed, and may be molded of a suitable plastic such as polyurethane foam.

The accelerometer mount 70 comprises a metallic cage-like structure formed by end pieces 71 and three longitudinal members 72. The end pieces are circular in shape while the longitudinal members 72 are portions of cylinders and fastened to the end members by suitable means such as small cap screws. A molded plastic mount could be used in place of the built-up metallic mount. A molded accelerometer support 73 is positioned within the cage member and provided with a cavity 74 in which the accelerometer 80 may be positioned. In particular, the cavity 74 may be a cylindrical opening extending partially through the support 73 so that the accelerometer may be inserted therein. The accelerometer 80 as supplied by Litton Industries is cylindrical in shape and has repeatable response to vertical accelerations when its longitudinal axis is horizontal regardless of the rotation about the longitudinal axis. It will respond to vertical accelerations regardless of its orientation but not as consistently as when it is mounted with its longitudinal axis in a horizontal plane. The accelerometer 80 is potted in a suitable material such as epoxy to isolate it from pressure waves impinging upon the seismic cable. As an alternative, the accelerometer could also be potted directly in the molded accelerometer support 73. In either construction the accelerometer should be bonded to the molded support 73 so that it responds to accelerations. The molded support 73 is insulated from the cage mount by foam members 76. The cage mount is further isolated from the stress members 63 by the foam pads 75. The foam pads 75 and foam members 76 should be relatively soft, resilient foam so that the accelerometer may respond to true acceleration forces but will not respond to the movement generated by the stress member 63 as the cable is towed through the water.

Referring now to FIGS. 4, 5 and 6, there is shown a second means for mounting the accelerometer. In particular, the accelerometer 80 is mounted in a plastic support member 90 which is disposed between the three equilateral stress members 63 as shown in FIG. 5. The support member 90 is provided with three radial arms 91 which have suitable U-shaped openings 92 for the stress members 63. The support member 90 has an outer diameter substantially equal to the inner diameter of the outer tubular member 61 of the cable. Thus, the support 90 will respond to any acceleration motions of the cable.

From the above description it is seen that two different means have been provided for mounting the accelerometer in a marine seismic cable. The mount shown in FIGS. 4, 5 and 6 is more subject to noise produced as the cable is towed through the water than the mount shown in FIGS. 1, 2 and 3. While it is more subject to noise, it is a much simpler mount to manufacture and under certain conditions would be preferred due to its lower cost. Also, it is obvious that means could be taken such as utilizing soft, resilient foam insulation to isolate the mount shown in FIGS. 4, 5 and 6 from the noise produced in the cable by towing. For example, similar foam insulation means such as those shown in FIGS. 1, 2 and 3 would be incorporated in the mount of FIGS. 4, 5 and 6. In both of the mounting means, the accelerometer is packaged in a package 80 by potting it in an outer metallic or plastic case. By potting the accelerometer in an outer case, its response to pressure waves is substantially eliminated and the accelerometer responds only to acceleration forces to provide a signal which may be combined with hydrophone signals to eliminate unwanted ghost reflections. While responding to acceleration forces, the use of soft resilient foam effectively isolates the accelerometer from motion produced by the stress members in the cable. Any motion produced by towing the cable through water will be converted to unwanted noise by the accelerometer.

What is claimed is:

1. A seismic streamer cable for use in marine seismic surveys, said cable comprising:
   a flexible tubular member, said tubular member being filled with a liquid;
   a plurality of stress members positioned in said flexible tubular member;
   an acceleration-responsive transducer, said acceleration responsive transducer being potted in an outer case and adapted to measure the vertical component of acceleration independent of its orientation; and
   a body having an aperture therein for containing said outer case, said body being made of a material such that the density of the combination of said acceleration responsive transducer in said outer case and said body is substantially equal to the density of said liquid.

2. A seismic streamer cable as recited in claim 1, wherein said plurality of stress members comprises three stress members and wherein said body comprises two end sections having three radial arms with three semicylindrical members sized to fit in the spaces between said radial arms such that one of said three stress members is positioned adjacent each of said semicylindrical members.

3. A seismic streamer cable as recited in claim 1, wherein said potting material surrounding said acceleration responsive transducer comprises epoxy.

4. A seismic streamer cable as recited in claim 2, further comprising resilient means for decoupling said acceleration responsive transducer from vibrations propagating along said stress members.

5. A seismic streamer cable as recited in claim 4, wherein said resilient means comprises resilient foam positioned between said stress members and said semicylindrical members.

6. A seismic streamer cable as recited in claim 5, wherein said resilient means further comprises resilient foam positioned between the spaces formed between said radial arms of said body and said semicylindrical members.

7. A seismic streamer cable as recited in claim 6, wherein said body is a metallic housing.

8. A seismic streamer cable as recited in claim 1, further comprising resilient means for decoupling said acceleration responsive transducer from vibrations propagating along said plurality of stress members.

9. A seismic streamer cable as recited in claim 8, wherein said resilient means comprises resilient foam.

10. A seismic streamer cable as recited in claim 1, wherein said body has a plurality of radial arms having apertures therein to accommodate said plurality of stress members and a central aperture, said acceleration responsive means being positioned in said central aperture.

11. A seismic streamer cable as recited in claim 10, wherein said plurality of stress members comprises three stress members and said plurality of radial arms on said mounting means comprises three radial arms.

* * * * *